United States Patent
Seo et al.

(10) Patent No.: US 8,548,412 B2
(45) Date of Patent: Oct. 1, 2013

(54) APPARATUS AND METHOD FOR ELIMINATING OUTBAND INTERFERENCE SIGNAL

(75) Inventors: Hae Moon Seo, Yongin-si (KR); Youn Sung Lee, Yongin-si (KR); Woo Chul Park, Incheon (KR); Myung Soo Lee, Yongin-si (KR); Myung Hyon Yoon, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 13/603,671

(22) Filed: Sep. 5, 2012

(65) Prior Publication Data

US 2012/0329419 A1    Dec. 27, 2012

Related U.S. Application Data

(62) Division of application No. 12/238,495, filed on Sep. 26, 2008, now Pat. No. 8,280,336.

(30) Foreign Application Priority Data

Sep. 16, 2008    (KR) .................. 10-2008-0090843

(51) Int. Cl.
*H04B 1/06*    (2006.01)
*H04B 7/00*    (2006.01)

(52) U.S. Cl.
USPC ......... 455/278.1; 455/323; 455/334; 375/346

(58) Field of Classification Search
USPC ...... 455/278.1, 296, 302–307, 310, 313–318, 455/323, 324, 326, 334; 375/346
See application file for complete search history.

(56) References Cited

U.S. PATENT DOCUMENTS

| | | | |
|---|---|---|---|
| 4,823,361 A * | 4/1989 | Yoshida ..................... | 375/348 |
| 7,336,698 B2 | 2/2008 | Nuutinen et al. | |
| 7,486,135 B2 * | 2/2009 | Mu ............................. | 330/51 |
| 7,522,887 B2 * | 4/2009 | Nagano et al. ............. | 455/78 |
| 2002/0172171 A1 | 11/2002 | Schilling et al. | |
| 2006/0281429 A1 * | 12/2006 | Kishi et al. ................. | 455/313 |
| 2008/0009258 A1 | 1/2008 | Safarian et al. | |

* cited by examiner

*Primary Examiner* — Nhan Le
(74) *Attorney, Agent, or Firm* — Sughrue Mion, PLLC

(57) ABSTRACT

Provided is an apparatus and method for eliminating an outband interference signal. An apparatus for eliminating an interference signal includes a first mixer, a filter unit, a second mixer, and an operation unit. The first mixer downconverts a received signal containing an outband interference signal. The filter unit extracts the downconverted outband interference signal from the downconverted received signal. The second mixer upconverts the downconverted outband interference signal to restore the outband interference signal to the original frequency band. The operation unit subtracts and eliminates the restored outband interference signal from the received signal.

5 Claims, 5 Drawing Sheets

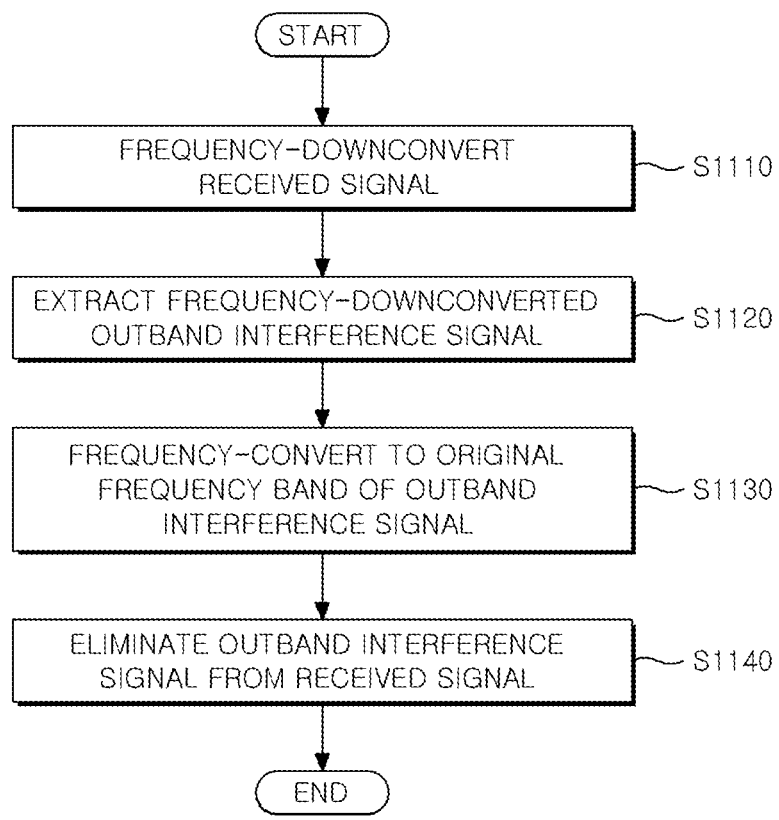

APPARATUS AND METHOD FOR ELIMINATING OUTBAND INTERFERENCE SIGNAL

CROSS-REFERENCE TO RELATED APPLICATION(S)

This is a divisional of application Ser. No. 12/238,495 filed Sep. 26, 2008, which claims the benefit under 35 U.S.C. §119(a) of a Korean Patent Application No. 10-2008-0090843, filed on Sep. 16, 2008 in the Korean Intellectual Property Office, the disclosure of which is incorporated herein by reference in its entirety.

TECHNICAL FIELD

The following disclosure relates to a technology for eliminating an interference signal from a received signal, and in particular, to an apparatus and method for eliminating an outband interference signal, which may enhance receiving (RX) sensitivity while eliminating an interference signal from a received signal.

BACKGROUND

Researches have been conducted to provide a multi-band, low-power, one-chip solution. A variety of wireless communication schemes have been used where each wireless communication receiver is additionally provided with a block capable of rejecting an interference signal due to other wireless communication.

A low noise amplifier (LNA) of a wireless communication receiver provides a high gain for sufficiently amplifying a weak signal input to an antenna. However, where an outband interference signal is inputted in the LNA, the linearity of the LNA's amplification may degrade. Therefore, it is desirable to eliminate an outband interference signal from a front end of the LNA.

A band pass filter (BPF) or a surface acoustic wave (SAW) filter may be used in an outband interference signal elimination method. Because it is difficult to product a high-Q (Quality factor) inductor necessary to use a sharp BPF, many wireless communication receivers use a SAW filter.

However, the use of a SAW filter may increase the implementation cost for a multi-band mode, and may cause a limitation in sharing a LNA for multi-band or multi-mode applications. Also, a SAW filter may cause an insertion loss of, for example, about 3 dB, thus degrading the RX sensitivity.

SUMMARY

According to an aspect, there is provided an apparatus and method for eliminating an outband interference signal, which may eliminate an outband interference signal without using a SAW filter.

According to another aspect, there is provided an apparatus and method for eliminating an outband interference signal, which may enhance the RX sensitivity due to a small insertion loss.

According to still another aspect, there is provided an apparatus for eliminating an interference signal, including a first mixer downconverting a received signal containing an outband interference signal, a filter unit extracting the downconverted outband interference signal from the downconverted received signal, a second mixer upconverting the downconverted outband interference signal to restore the outband interference signal to the original frequency band, and an operation unit subtracting and eliminating the restored outband interference signal from the received signal.

According to yet another aspect, there is provided an apparatus for eliminating an interference signal, including a balun transformer dividing a received signal containing an outband interference signal into a first signal and a second signal that are identical to each other, a first mixer downconverting the first signal and the second signal, a filter unit extracting the downconverted outband interference signals from the downconverted first signal and the downconverted second signal, a second mixer upconverting the extracted outband interference signals to restore the outband interference signals to the original frequency band, and an operation unit subtracting the restored outband interference signals from the first signal and the second signal.

According to yet another aspect, there is provided an apparatus for eliminating an interference signal, including a first mixer downconverting a received signal containing an outband interference signal, a filter unit extracting the downconverted outband interference signal from the downconverted received signal, a second mixer upconverting the downconverted outband interference signal to restore the outband interference signal to the original frequency band, an operation unit subtracting and eliminating the restored outband interference signal from the received signal, a variable attenuator controlling the amplitude of the outband interference signal before the restored outband interference signal is provided to the operation unit, a delay unit delaying the received signal by a predetermined time in consideration of the process times of the first mixer, the filter unit and the second mixer and providing the resulting signal to the operation unit, and a low-noise amplifier low-noise-amplifying the received signal without the outband interference signal.

According to yet another aspect, there is provided a method for eliminating an interference signal, including downconverting a received signal containing an outband interference signal, extracting the downconverted outband interference signal from the downconverted received signal, upconverting the downconverted outband interference signal to restore the outband interference signal to the original frequency band, and eliminating the restored outband interference signal from the received signal.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 11 is a flow diagram illustrating an outband interference signal elimination method according to an exemplary embodiment.

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
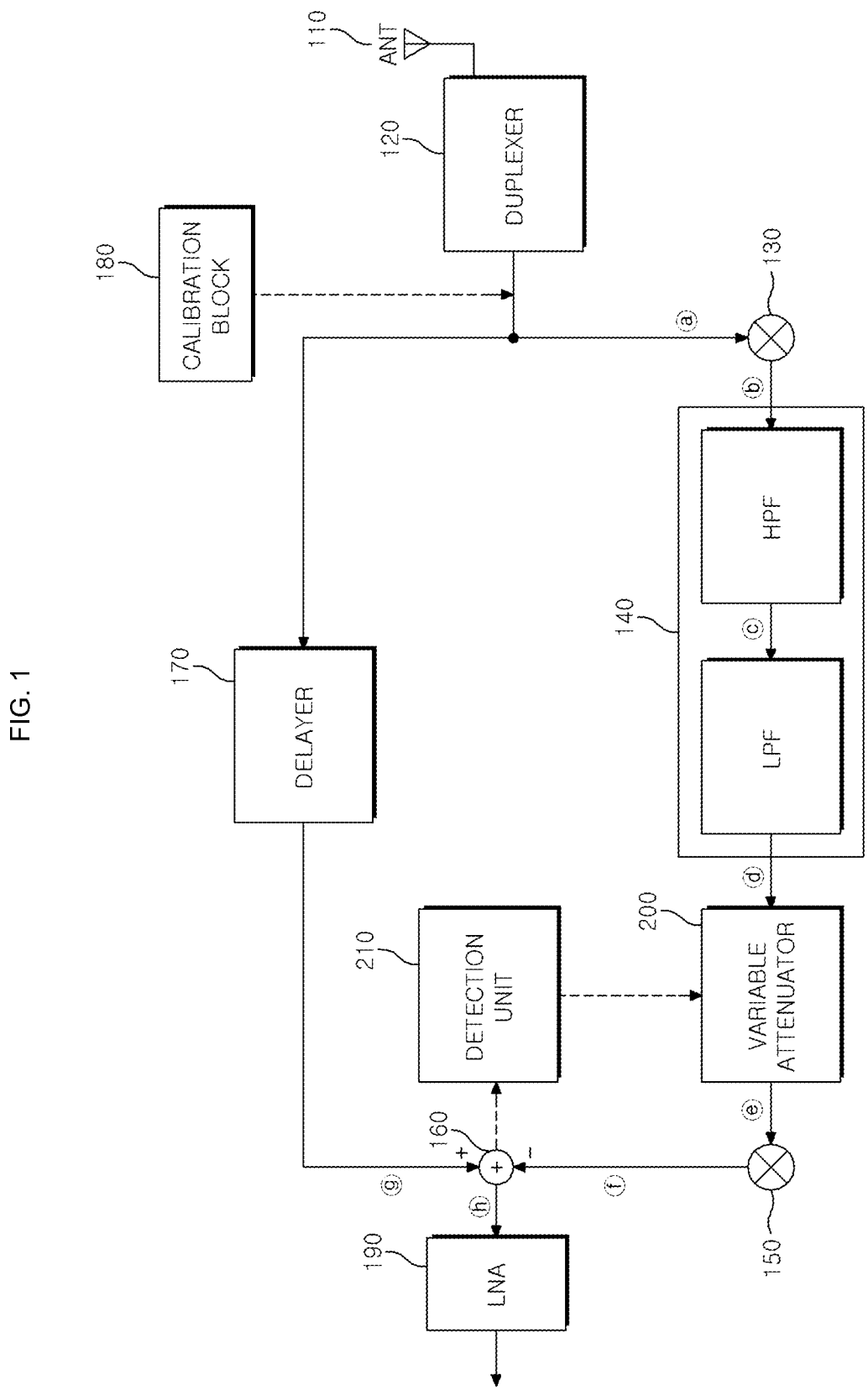
FIG. 1 is a block diagram illustrating an apparatus for elimination of an outband interference signal according to an exemplary embodiment.

FIG. 1 illustrates an apparatus for elimination of an outband interference signal according to an exemplary embodiment. FIGS. 2 to 9 are graphs illustrating a frequency-domain spectrum of an apparatus for elimination of an outband interference signal according to an exemplary embodiment. Hereinafter, the respective components of an apparatus for elimination of an outband interference signal according to an exemplary embodiment will be described with reference to FIGS. 1 to 9.

Referring to FIG. 1, the apparatus for elimination of an outband interference signal outputs a signal (h) by eliminating an outband interference signal from a received signal (a). The apparatus comprises a first mixer 130, a filter unit 140, a second mixer 150, a delayer 170, and an operation unit 160.

The first mixer 130 outputs a signal (b) by downconverting the received signal (a) containing an outband signal, which is separated by a duplexer 120 after being received through an antenna 110, to a local frequency band. For example, the first mixer 130 downconverts the received signal (a) into the signal (b) by multiplying the received signal (a) by a local-frequency signal LO that is generated by a local frequency generator (not illustrated).

The duplexer 120 separates a transmitting (TX) signal and a receiving (RX) signal by frequency division so that the TX signal and the RX signal do not collide with each other. Herein, the duplex 120 may be replaced with a switch that separates a TX signal and an RX signal by time division so that the TX signal and the RX signal do not collide with each other.

The filter unit 140 extracts a downconverted outband interference signal (d) from the output signal (b) of the first mixer 130. The filter unit 140 includes a high pass filter (HPF) and a low pass filter (LPF).

For example, the HPF extracts a high-frequency signal (c) containing an outband interference signal from the output signal (b) of the first mixer 130, and the LPF extracts the downconverted outband interference signal (d) from the signal (c).

Although FIG. 1 illustrates that the filter unit 140 outputs the downconverted outband interference signal (d) by passing the signal (b) through the HPF and then through the LPF, the filter unit 140 may be configured to output the downconverted outband interference signal (d) by passing the signal (b) through the LPF and then through the HPF.

The second mixer 150 upconverts the downconverted outband interference signal (d) into an outband interference signal (f) of an original frequency band by multiplying the downconverted outband interference signal (d) by a local-frequency signal.

The operation unit 160 outputs a signal (h) by subtracting the outband interference signal (f) from a received signal (g) delayed by a predetermined time.

Herein, the received signal (a), which is separated by a duplexer 120 after being received through an antenna 110, is divided into two identical signals that are provided respectively to the delayer 170 and the first mixer 130. The delayer 170 delays the signal (a) by a time taken to perform the operations of the first mixer 130, the filter unit 140 and the second mixer 150, and provides the resulting signal (g) to the operation unit 160.

Thereafter, the signal (h) is low-noise-amplified by a low noise amplifier (LNA) 190 for use in various processes.

The apparatus for elimination of an outband interference signal may further comprise a variable attenuator 200 and a detection unit 210. By the calibration on/off control of a microcomputer (not illustrated), the variable attenuator 200 attenuates the amplitude of the downconverted outband interference signal (d) and provides the resulting signal (e) to the second mixer 150. The detection unit 210 controls the amplitude attenuation level of the variable attenuator 200.

That is, in a calibration-on state, the apparatus controls the set amplitude offset of the variable attenuator 200 and the detection unit 210 to compensate a mismatch between a first path and a second path, and operates the variable attenuator 200 and the detection unit 210 by receiving the fed-back operation results of the operation unit 160, thereby reducing the residual outband interference signal. In a calibration-off state, the apparatus may compensate only a mismatch between the first path and the second path by operating only a calibration block 180 without operating the variable attenuator 200 and the detection unit 210, or may omit the mismatch compensation by the variable attenuator 200, the detection unit 210 and the calibration block 180.

The detection unit 210 may set an amplitude offset value according to a mismatch between the first path including the filter unit 140 and the second mixer 150 and the second path including the delayer 170 by using the calibration block 180, or may set the amplitude offset value by extraction of the residual outband interference signal by receiving the fed-back output of the operation unit 160. That is, before elimination of the outband interference signal from the received signal, the detection unit 210 compensates the mismatch between the first path and the second path so that the mismatch between the first path and the second path does not affect the elimination of the outband interference signal from the received signal.

In another embodiment, the detection unit 210 receives the fed-back output signal (h) of the operation unit 160, detects the residual outband interference signal, and uses the same for the amplitude control of the variable attenuator 200, and the settings for the amplitude control of the detection unit 210 may change frequently (e.g., real-timely, periodically or intermittently). In this case, the detection unit 210 detects the amplitude from the power of the residual outband interference signal, converts the detected amplitude into an analog signal, and provides the analog signal to the variable attenuator 200, thereby controlling the amplitude of the outband interference signal.

Before inputting of the received signal, the calibration block 180 outputs a virtual outband interference signal through the oscillation of an oscillator (not illustrated), detects the mismatch between the first path and the second path, and provides the same to the detection unit 210. Herein, the virtual outband interference signal of the oscillator may be a signal of a frequency band that is adjacent to a frequency band of a transmitter-receiver using an apparatus for elimination of outband interference signal.

Unlike the illustration of FIG. 1, the variable attenuator 200 may be provided to control the amplitude of the output signal (f) of the second mixer 150.

Hereinafter, the spectrum of the output/input signals of the respective components of the apparatus according to an exemplary embodiment will be described with reference to FIGS. 2 to 9.

Figure 2:
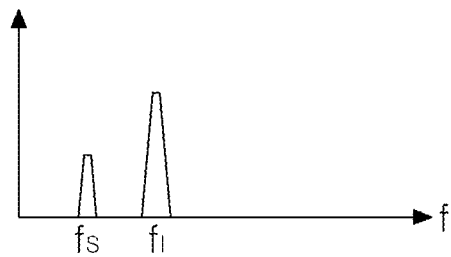
FIGS. 2 to 9 are graphs illustrating a frequency-domain spectrum of an apparatus for elimination of an outband interference signal according to an exemplary embodiment.

FIG. 2 illustrates the spectrum of the signal ⓐ, which is received by the antenna 110, separated by the duplexer 120 or the switch and then input to the first mixer 130 and the delayer 170. It may be seen from FIG. 2 that the signal ⓐ contains a desired signal $f_S$ and an undesired interference signal $f_1$.

Figure 3:
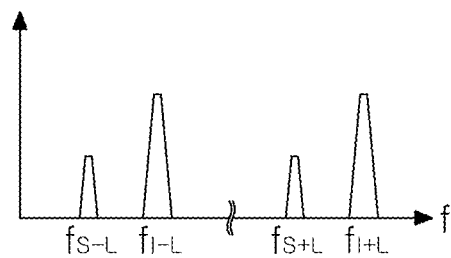

FIG. 3 illustrates the spectrum of the output signal ⓑ of the first mixer 130. It may be seen from FIG. 3 that the outband interference signal $f_1$ is downconverted into a signal $F_{1\text{-}L}$ of a local frequency band LO.

Figure 4:
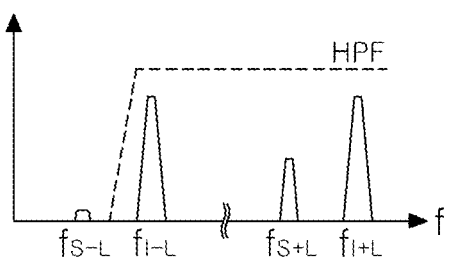

FIG. 4 illustrates the spectrum of the output signal ⓒ of the HPF of the filter unit 140. It may be seen from FIG. 4 that a signal of a local frequency band below $F_{1\text{-}L}$ was eliminated.

Figure 5:
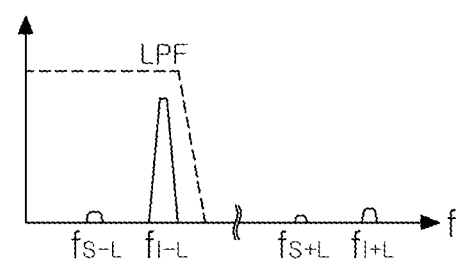

FIG. 5 illustrates the spectrum of the output signal ⓓ of the LPF of the filter unit 140. It may be seen from FIG. 5 that signals of a local frequency band above $F_{1\text{-}L}$ were eliminated.

Figure 6:
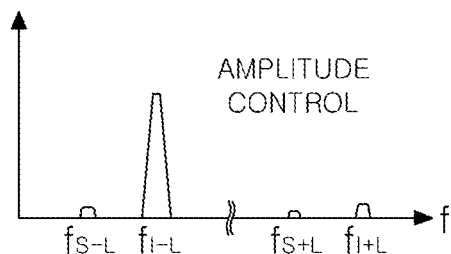

FIG. 6 illustrates the spectrum of the output signal ⓔ of the variable attenuator 200. It may be seen from FIG. 6 that the signal ⓔ is not significantly different in shape from the signal ⓓ. However, the signal ⓔ is a signal that is compensated the amplitude error by inputting the signal ⓓ to the variable attenuator 200.

Figure 7:
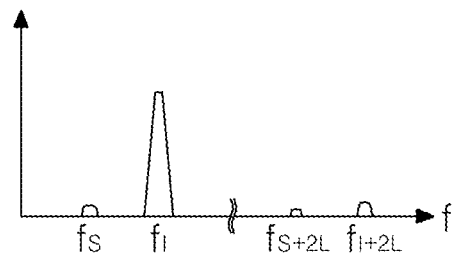

FIG. 7 illustrates the spectrum of the output signal ⓕ of the second mixer 150, which is upconverted into the original frequency band of the outband interference signal.

Figure 8:
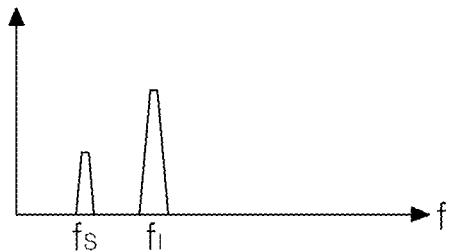

FIG. 8 illustrates the spectrum of the output signal ⓖ of the delayer 170, which is nearly identical to the received signal ⓐ in terms of the frequency spectrum.

Figure 9:
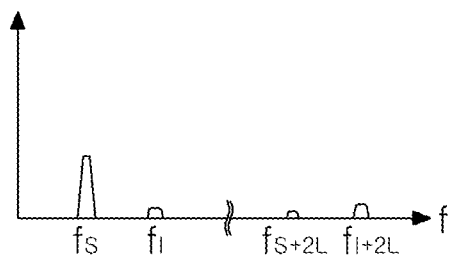

FIG. 9 illustrates the spectrum of the signal ⓗ obtained by subtracting the output signal ⓕ of the second mixer 150 from the output signal ⓖ of the delayer 170. It may be seen from FIG. 9 that the outband interference signal $F_1$ was eliminated.

Thereafter, the signal ⓗ is low-noise-amplified by the LNA 190 for use in various processes.

According to an exemplary embodiment described above, an outband interference signal may be eliminated from a received signal ⓐ without using a band pass filter (BPF) or a SAW Filter.

Figure 10:
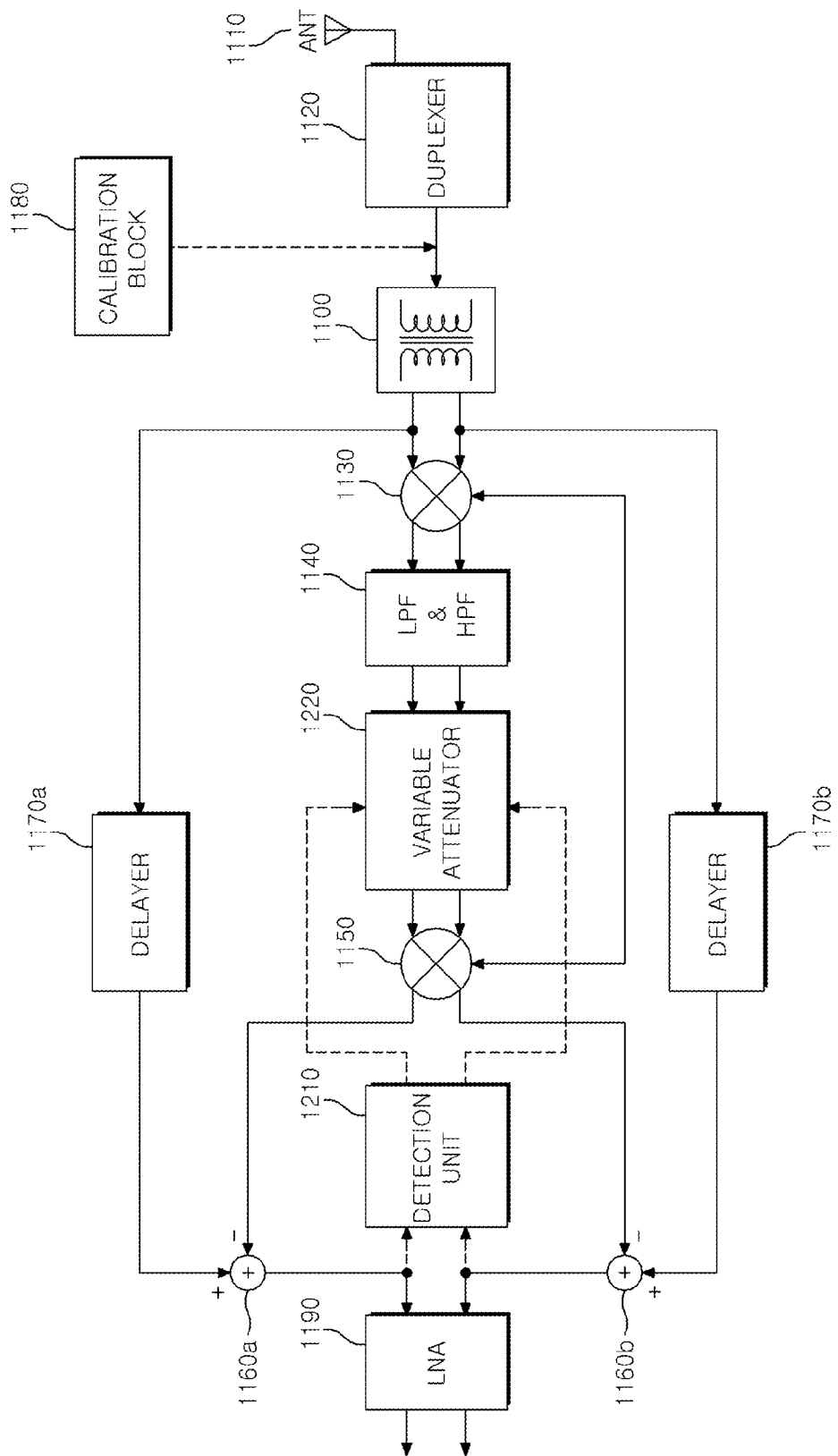
FIG. 10 is a block diagram illustrating an apparatus for elimination of outband interference signal according to another exemplary embodiment.

FIG. 10 illustrates an apparatus for elimination an outband interference signal according to another exemplary embodiment.

Referring to FIG. 10, the apparatus for elimination of an outband interference signal divides a received signal into two signals, detects an outband interference signal of each of the two signals, and eliminates the outband interference signal from each of the two signals. The apparatus comprises a balance-to-unbalance (balun) transformer 1100, delayers 1170a and 1170b, a first mixer 1130, a filter unit 1140, a second mixer 1150, and operation units 1160a and 1160b.

The balun transformer 1100 divides a single-ended received signal containing an outband interference signal into differential-ended first and second signals that are identical to each other.

The first mixer 1130 downconverts the first signal containing an outband interference signal and the second signal containing an outband interference signal to a local frequency band by multiplying the first signal and the second signal by a signal of a local frequency band.

The filter unit 1140 extracts the outband interference signal contained in the downconverted first signal and the outband interference signal contained in the downconverted second signal.

The second mixer 1150 upconverts the extracted outband interference signals to the original frequency band by multiplying the extracted outband interference signals by a signal of a local frequency band.

The operation unit 1160a/1160b outputs the first/second signal without an interference signal by subtracting the upconverted outband interference signal from the first/second signal delayed by a predetermined time.

Herein, the first and second signals divided by the balun transformer 1100 are provided to the delayers 1170a and 1170b and the first mixer 1130. The delayers 1170a and 1170b delay the first and second signals by a time taken to perform the operations of first mixer 1130, the filter unit 1140 and the second mixer 1150, and provides the resulting signals to the operation units 1160a and 1160b.

Thereafter, the first and second signals without an outband interference signal are low-noise-amplified by a differential low noise amplifier (LNA) 1190 for use in various processes.

The apparatus for elimination of an outband interference signal may further comprise a variable attenuator 1220 and a detection unit 1210. By the calibration on/off control of a microcomputer (not illustrated), before provision of the first and second signals to the operation units 1160a and 1160b, the variable attenuator 1220 attenuates the amplitude of the restored outband interference signal and provides the resulting signal to the second mixer 1150. The detection unit 1210 controls the amplitude attenuation level of the variable attenuator 1220.

That is, in a calibration-on state, the apparatus controls the set amplitude offset of the variable attenuator 1220 and the detection unit 1210 to compensate a mismatch between a first path and a second path, and operates the variable attenuator 1220 and the detection unit 1210 by receiving the fed-back operation results of the operation units 1160a and 1160b, thereby reducing the residual outband interference signal. In a calibration-off state, the apparatus may compensate only a mismatch between the first path and the second path by operating only a calibration block 1180 without operating the variable attenuator 1220 and the detection unit 1210, or may omit the mismatch compensation by the variable attenuator 1220, the detection unit 1210 and the calibration block 1180.

The detection unit 1210 may set an amplitude offset value according to a mismatch between the first path including the second mixer 1150 and the second path including the delayers 1170a and 1170b by using the calibration block 1180, or may set the amplitude offset value by extraction of the residual outband interference signal by receiving the fed-back output of the operation units 1160a and 1160b. That is, before elimination of the outband interference signal from the first and second signals, the detection unit 1210 compensates the mismatch between the first path and the second path so that the mismatch between the first path and the second path does not affect the elimination of the outband interference signal from the received signal. In another embodiment, the detection unit 1210 receives the fed-back output signals of the operation units 1160a and 1160b, detects the residual outband interference signal, and uses the same for the amplitude control of the variable attenuator 1220, and the settings for the amplitude control of the detection unit 1210 may change frequently (e.g., real-timely, periodically or intermittently). In this case, the detection unit 1210 detects the amplitude from the power of the residual outband interference signal, converts the detected amplitude into an analog signal, and provides the analog signal to the variable attenuator 1220, thereby controlling the amplitude of the outband interference signal.

Before inputting of the received signal, the calibration block 1180 outputs a virtual outband interference signal through the oscillation of an oscillator (not illustrated), detects the mismatch between the first path and the second path, and provides the same to the detection unit 1210. Herein, the virtual outband interference signal of the oscillator may be a signal of a frequency band that is adjacent to a frequency band of a transmitter-receiver using an apparatus for elimination of outband interference signal.

Hereinafter, an operation of an apparatus for elimination of an outband interference signal according to an exemplary embodiment will be described with reference to FIG. 11.

FIG. 11 is a flow diagram illustrating an outband interference signal elimination method according to an exemplary embodiment.

Referring to FIG. 11, in operation S1110, the apparatus downconverts a received signal containing an outband interference signal by using a local frequency signal.

In operation 1120, the apparatus detects a downconverted outband interference signal from the downconverted received signal. Herein, the apparatus extracts the downconverted outband interference signal by filtering the received signal using a HPF and a LPF.

In operation 1130, the apparatus upconverts the downconverted outband interference signal to the original frequency band.

In operation 1140, the apparatus eliminates the outband interference signal from the received signal by operating the received signal and the upconverted outband interference signal.

Herein, the received signal of the operation S1140 may be delayed by a time taken to perform the operations S1110 to S1130.

The embodiment of FIG. 10 is similar to the embodiment of FIG. 1 with the exception that, for example, the balun transformer 1100 divides the received signal into two identical signals and the signal without an outband interference signal is input to the differential LNA 1190.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

According to certain embodiments described above, a miniaturized one-chip structure may be obtained. Also, the use of certain exemplary embodiments may enhance the RX sensitivity due to a small insertion loss while eliminating an outband interference signal.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for eliminating an interference signal, comprising:
    a balun transformer dividing a received signal containing an outband interference signal into a first signal and a second signal that are identical to each other;
    a first mixer downconverting the first signal and the second signal;
    a filter unit extracting the downconverted outband interference signals from the downconverted first signal and the downconverted second signal;
    a second mixer upconverting the extracted outband interference signals to restore the outband interference signals to an original frequency band; and
    an operation unit subtracting the restored outband interference signals from the first signal and the second signal,
    wherein the first and the second signals are delayed by a predetermined time in consideration of the process times of the first mixer, the filter unit and the second mixer and the resulting signals are provided to the operation unit.

2. The apparatus of claim 1, further comprising a variable attenuator controlling the amplitude of the outband interference signal before the restored outband interference signal is provided to the operation unit.

3. The apparatus of claim 1, further comprising a low-noise amplifier low-noise-amplifying the first and second signals without the outband interference signal.

4. The apparatus of claim 1, wherein the filter unit comprises:
    a high-pass filter extracting a high frequency band signal containing the outband interference signal from the downconverted first and second signals; and
    a low-pass filter extracting a low frequency band signal containing the outband interference signal from the extracted first and second signals.

5. An apparatus for eliminating an interference signal, comprising:
    a balun transformer dividing a received signal containing an outband interference signal into a first signal and a second signal that are identical to each other;
    a first mixer downconverting the first signal and the second signal;
    a filter unit extracting the downconverted outband interference signals from the downconverted first signal and the downconverted second signal;
    a second mixer upconverting the extracted outband interference signals to restore the outband interference signals to an original frequency band; and
    an operation unit subtracting the restored outband interference signals from the first signal and the second signal,
    wherein the apparatus further comprises:
        a variable attenuator controlling the amplitude of the outband interference signal before the restored outband interference signal is provided to the operation unit; and
        a detection unit detecting the power of the residual outband interference signal according to the subtraction result and providing the detected power to the variable attenuator, and
    wherein the variable attenuator controls the amplitude of the outband interference signal according to the detected power.

* * * * *